(12) United States Patent
Lenz (10) Patent No.: US 6,853,312 B2
(45) Date of Patent: Feb. 8, 2005

(54) METHOD AND DEVICE FOR DIGITAL CONTROL OF ELECTRICAL CONSUMERS IN A MODEL RAILWAY

(75) Inventor: Bernd Lenz, Giessen (DE)

(73) Assignee: Lenz Elektronik GmbH, Giessen-Allendorf (DE)

( * ) Notice: Subject to any disclaimer, the term of this patent is extended or adjusted under 35 U.S.C. 154(b) by 36 days.

(21) Appl. No.: 10/612,737

(22) Filed: Jul. 2, 2003

(65) Prior Publication Data

US 2004/0010356 A1 Jan. 15, 2004

(30) Foreign Application Priority Data

Jul. 9, 2002 (EP) ............................................. 02015244

(51) Int. Cl.[7] ................................................ G08G 1/00
(52) U.S. Cl. ..................... 340/904; 340/635; 340/693.1; 340/693.3; 246/122 A
(58) Field of Search ................................. 340/904, 933, 340/3.1, 635, 693.1, 693.3, 693.4; 246/122 A (56) References Cited

U.S. PATENT DOCUMENTS

| 4,027,840 A | * | 6/1977 | Blair ...................... 246/122 R |
| 4,151,969 A | * | 5/1979 | Wood ..................... 246/122 R |
| 5,867,475 A | * | 2/1999 | Moriya et al. ........... 369/275.3 |
| 5,896,017 A | | 4/1999 | Severson et al. |
| 6,140,791 A | * | 10/2000 | Zhang ........................ 318/632 |
| 6,220,552 B1 | | 4/2001 | Ireland |
| 6,494,410 B2 | | 12/2002 | Lenz |
| 6,539,292 B1 | | 3/2003 | Ames, Jr. |

FOREIGN PATENT DOCUMENTS

| DE | 100 11 978 A1 | 10/2001 |
| DE | 101 03 202 A1 | 9/2002 |

* cited by examiner

*Primary Examiner*—Daryl C. Pope
(74) *Attorney, Agent, or Firm*—Quarles & Brady LLP (57) ABSTRACT

A method and device for digital control of electrical consumers in a model railway comprising supplying consumers having contact to a track with energy by means of a square wave voltage which is applied to the track and controlling the consumers by modulation of the square wave voltage in accordance with a digital control information, generating a return signal in a consumer having been supplied with such control information, interrupting application of the square wave voltage from the track during a predetermined time interval, the consumer applying the return signal within the predetermined time interval to the track being now square wave voltage free and detecting the return signal transmitted via the track by means of a sensor connected to the track.

16 Claims, 4 Drawing Sheets

Examplary packet for data transmission to a consumer

Figure 1

Examplary packet for data transmission to a consumer

Figure 2

Gap interval arranged in NMRA-track signal

METHOD AND DEVICE FOR DIGITAL CONTROL OF ELECTRICAL CONSUMERS IN A MODEL RAILWAY

CROSS REFERENCES TO RELATED APPLICATIONS

Not Applicable

STATEMENT REGARDING FEDERALLY SPONSORED RESEARCH

Not Applicable

BACKGROUND OF THE INVENTION

The present invention relates to a method and a device for digital control of electrical consumers in a model railway, in which: the consumers are provided with energy by means of a square wave voltage applied to the track, and are controlled by modulation of this square wave voltage in accordance with a digital control information, and a consumer having received a control information intended for the consumer applies a return signal to the track. The modulation of this combined control and power supply voltage, also referred to as track signal, is preferably a pulse width and/or frequency modulation. To this end, a control device connected to the track is provided, which modulates the square wave voltage in accordance with digital control information and, in this manner, not only supplies the consumers with energy but also controls them as well. In the consumer there are provided a receiver for receiving the control information and, in addition thereto, a return signal generator for generating a return signal returned via the track. The return signal generator is preferably integrated in the receiver. In other words, the invention relates to a method and a device which make bi-directional data transmission possible in digitally controlled model railways.

The term square wave voltage here denotes a voltage having a rectangular wave form relative to the basic frequency of this voltage, i.e. a voltage having an approximately rectangular voltage wave shape. Basically, the present invention may be applied to other voltage shapes as well, for example a voltage having a sinusoidal gradient; however, modulation with digital control information and hence demodulation then become more complicated. Furthermore, the NMRA standards mentioned further below require a rectangular voltage gradient.

Such a control including return signal generation has been known from DE 100 11 978 A1 and had been developed to meet increasing demands for returning information from consumers on the model railway to the control device or to indicating and operating components of the model railway. In the electrical consumers, receivers for digital control information are provided. Such consumers may both be mobile consumers (locomotives, as a rule) and stationary consumers (track switch operation mechanisms, for example) as has been described in detail in DE 100 11 978 A1. The returned information may include a locomotive address, an actual speed value, a motor temperature, etc. When assigning this information data to a corresponding track section where they have been received by the consumer located on the section, an easy localization of mobile consumers by means of a central control device provided for a plurality of track sections becomes possible. If the central control then has a return signal or return message, for example in form of a command acknowledgement, the control functions for the model railway can be optimized and a comfortable and safe operation is possible.

A solution shown in DE 100 11 978 A1 for implementing return signals was designed such that existing standards for control of digital model railways are not violated and the performance of control components is not impaired. The standard on which both DE 100 11978 A1 and the present application are based corresponds to NMRA DCC Electrical Standard and NMRA DCC Communication Standard for the transmission of data on the track, or track sections, respectively, of a model railway system.

In DE 100 11 978 A1, the supply voltage supplied to the track is a square wave voltage which, depending on the digital control information, is frequency and/or pulse length modulated. The method of DE 100 11 978 A1 is characterized in that a consumer supplies the track with a return signal of a frequency higher than the frequency of the modulated square wave voltage. This return signal is, under synchronization on the square wave voltage, detected in sections of the square wave voltage which are free of signal edges. In this method, the square wave voltage is superimposed by the higher frequency return signal. Detection of the return signal occurs in signal edge free voltage sections of constant digital level, preferably longer signal edge free sections resulting from the modulation, such as the second signal half of a zero information bit when using the NMRA DCC Electrical Standard and the NMRA DCC Communication Standard.

This process, however, requires means for generating a transmitting or carrier frequency, and moreover means provided for recovering the returned signal from noise spectrum on the track which always exists. When, as usual, a plurality of track sections insulated from each other exist, elaborate filters for avoiding cross talk from signal returning consumers located at other track sections are required. The individual bits of the return signal are timely synchronized to the track signal. This leads to a limitation of the amount and rate of transmission. Per track bit, one return bit can only be transmitted. There exists a possibility of a negative influence on the return signal transmission by already-existing digital components on the model railway which do not comply with the requirements for the transmission of return data and which attenuate the return signal too much.

In a control system according to U.S. Pat. No. 6,220,552 B1, interference pulses from various sources are removed, under correspondingly high technical efforts in order to detect the presence of individual pulse sequences. Detection and evaluation of the pulse sequences, inter alia by means of determining their polarities, are elaborate and time consuming so that rapid data transfer is not possible. The signal line impedances of a wired model railway described in that patent are stated to allow a detector to receive the signal to be detected both directly from the track and from the central control. Hence, an unambiguous assignment of the signal polarity or direction required to detect the pulse sequences is possible only with increased elaboration.

The elaboration for avoiding cross-talk is correspondingly large. Regarding the cross-talk of individual bits to the track signal, the above-referenced limitation applies in the present case as well.

In an earlier not pre-published application DE 101 03 202 assigned to the Assignee of the present application, a return transmission for localizing a locomotive on a track section of a model railway having a plurality of separated track sections is described. In that case again, a localizing return signal of higher frequency than the frequency of the square wave voltage is superposed to the square wave voltage while synchronizing it thereto. A problem comes up similar to that described in DE 100 11 978 A1.

SUMMARY OF THE INVENTION

An objective of the present invention is to improve a method and a device for digital control of electrical consumers in a model railway, in which extensive hardware required for implementing the method, or the device, respectively, is avoided. This objective is accomplished by the subject of the independent claims. Preferred further developments are defined in the subclaims.

According to one aspect of the invention, there is provided a method for digital control of electrical consumers in a model railway comprising: supplying consumers having contact to a track with energy by means of a square wave voltage which is applied to the track as well as controlling the consumers by modulation of the square wave voltage in accordance with a digital control information; generating a return signal in a consumer having been supplied with such control information; interrupting application of the square wave voltage supplying power and digital control information from the track during a predetermined time interval, the consumer applying the return signal within the predetermined time interval to the track being now square wave voltage free; and detecting the return signal transmitted via the track by means of a sensor connected to the track during the predetermined time interval. In other words, the invention generates a gap corresponding to the predetermined time interval in which the square wave voltage is interrupted or blanked out.

In a preferred embodiment, interruption of the power supply is effected by disconnecting the track from a controller means which generates the modulated square wave voltage. This can be done by shorting track connections or inserting a current sensing resistor to establish a closed current loop for information transmission.

In another preferred embodiment, the digital control information is transmitted in successive control packets and the predetermined time of interruption or gap-time is provided either between two successive control packets or in a portion at the start of a preamble of a control packet. Preferably, the length of the gap is adjusted to be a multiple of the duration of a 1 bit-period of the control packet such as a three to four fold multiple of the duration and, for adjusting the start of the gap, a packet end bit of a control packet is used as time reference. In a further preferred embodiment, control information having been transmitted prior to the control information via the track is evaluated.

According to another aspect of the invention, there is provided a device for the digital control of electrical consumers in a model railway comprising: a supply and control unit controlling consumers having contact to a track by means of a square wave voltage which is applied to the track for supplying the consumers with energy as well as for controlling the consumers by modulation of the square wave voltage in accordance with a digital control information; a return signal generator provided in the consumer being supplied with such control information for generating a return signal in response to such control information; interrupting means interrupting application of the square wave voltage from the track during a predetermined time interval, also referred to herein as a gap, the consumer applying the return signal within the predetermined time interval to the track being now square wave voltage free; and a sensor connected to the track detecting the return signal transmitted via the track during the predetermined time interval.

Preferably, the interrupting means is provided between the controller unit and the track, and track terminal connecting means are provided for connecting track terminals separated from the controller means via a current sensor.

In a further preferred embodiment, evaluation means are provided which receives the modulated square wave voltage from the supply and controller unit and evaluates the digital control information for generating a control signal for the interrupting means such as to initiate and terminate the predetermined time interval or gap, and the evaluation means generates a control signal for the track terminals connecting means.

In another preferred embodiment, detecting and control means are provided in the consumer, which are connected to the return signal generator and which determine, based on the digital control information transmitted via the track, the start of the gap and trigger the return signal generator to apply the return signal to the track. The return signal generator preferably comprises a power source powered by a buffer capacitor provided in the consumer.

BRIEF DESCRIPTION OF THE DRAWINGS

In the following, preferred embodiments of the invention and further aspects thereof will be explained in more detail based on the accompanying drawings wherein.

DESCRIPTION OF THE PREFERRED EMBODIMENT

In accordance with the invention, the modulated square wave voltage, the so-called track signal, and thereby the power supply to the track is disconnected for a short time interval from the central control unit. At the same time, the track terminals, free of power voltage during that time interval, are preferably connected via a current sensor with one another. In one embodiment of the present invention, the disconnected track is short-circuited or terminated by a current measuring or sensing resistor, for this purpose. The predetermined time interval is referred to as a gap during which the track is disconnected for a relatively short period of time from a control means which is, in general, a central control. During this period of time, the track terminals disconnected from the central control are connected to one another to form a closed current loop.

By providing the gap, i.e. by interrupting or blanking a portion of the supply voltage constantly generated by the central control and thus constantly supplied to the track, an electrically largely interference-free transmission line via the track is established. This transmission line is established between a stationary or mobile consumer which is equipped with return signal generating means and a measuring sensor or a sensor which is either permanently available or is connected for the gap time period only. During the gap, the track as transmission line is not only free of voltage but also free of interference signals from the consumers existing on the track. This is the case because all digital consumers are connected to the track via rectifying elements which prevent that interferences by motors provided in the consumer or by other motor-free consumers, such as lamps on the track, will induce feedback to the track.

During the gap, information from a consumer addressed beforehand by the digital control, for example a locomotive receiver having return signal generation means, are transmitted to an evaluation unit connected to the sensor. The evaluation unit evaluates this information, at least as to proper receipt, and supplies them, for example, to the central control unit or to operating and indicator elements.

Preferably, the return signal is generated and transmitted not immediately after the start of the gap but rather delayed, for example, by a 1-bit period of the above-referenced data transmission standard according to NMRA corresponding to 116 $\mu$s. This offers the advantage that, prior to applying the return signal to the track, all interfering signals, such as inductively stored energy in particular, may be dissipated. Such dissipation is promoted by the preferred short circuit or termination at the track terminals via a current sensor only which substantially does not affect dissipation.

The voltage free transmission path allows an easy data transmission for the return signal. Preferably, a current loop implemented by line termination, or short circuit, respectively, is used for this data transmission and a modulated current signal of preferably 20 mA is transmitted via the loop. This current signal can be sensed, detected and evaluated in evaluation means in a simple manner using a sensor or transducer, for example a resistor, but also by using a small pulse transmitter, by using transformers, coil elements, Hall effect elements, and the like. While the magnitude of the current amplitude is freely selectable in principle, the current amplitude should be chosen within a reasonable range, such as between 1 mA and 100 mA, in order to allow for a still safer and reliable detection at small cost, on one hand, and to avoid unnecessary losses, on the other. Moreover, the current should be limited so that the above mentioned rectifiers in the digitally controlled consumers do not pass over into a conductive state. This as for the rest is one of the reasons why current modulation rather than voltage modulation for return signal generation and transmission is preferred.

By providing the voltage free transmission line, it is, moreover, possible to transmit information with a comparatively high data rate of for example 10 kbaud and higher. In the present embodiment, 125 kbaud has been chosen. In order to avoid a too slow pulse transfer rate and unnecessary energy losses as well as a difficult signal conditioning, it is recommended to set the data rate in the range of 10 kbaud to 1 to 5 Mbaud maximum.

Generating the gap and interrupting the track signal is preferably affected between the end of a track data packet and the beginning of the following data packet, i.e. between the packet end bit of the first mentioned packet and the preamble of the following data packet. To this end, a gap between the data packets could be provided. It is, however, preferred to have a non-interrupted packet sequence wherein the gap is initiated by the packet end bit of a data packet and extends into the preamble of the following packet. In this manner, the transmission of digital control information from the central control to a consumer via the track remains unimpaired and the central control can continuously generate the modulated square wave voltage in a common manner, for example according to common standards.

The time interval for the gap during which the track signal is blanked is, in the present standard, preferably in the range of approximately 100 to 500 $\mu$s and, ideally, is selected as a multiple of the duration of a 1-bit period. In the present embodiment, the gap time corresponds to four 1-bit periods, and thus has a length of nominally 464 $\mu$s. If less than 1 byte is to be returned, a time interval of less than 100 $\mu$s could be selected. A reasonable upper limit with a view to the interrupted power supply of the consumer and the control behavior corresponds to about 1 ms. In this connection, discharging of a buffer capacitor preferably used for generating the return signal and for providing continued power supply of the consumer are to be taken into consideration, as will be explained further below.

In applicant's experiments, the gap for commercially available consumers does not have any effect on the performance thereof since contact interruptions between wheel and track which occur in normal operation have already been taken into consideration when constructing receivers provided in the consumers. Such interruptions caused by normal operation might even be of a duration exceeding the selected gap and may occur at any, even unfavorable, time without creating any disadvantageous effects.

As concerns return transmission, a simplification is achieved on the transmitter side in the consumer and in the evaluating means thereof because the return signal is no longer timely synchronized to individual bits of the track signal and hence no bit-wise synchronization has to be provided. Moreover, it is now possible to use, for data transmission, a hardware which is already available in many micro controllers, namely an asynchronous serial interface (UART) for data reception and data transfer to the central control or to other components. The signal of the UART may, alternatively or additionally, also be indicated. In this manner, significant simplifications of the operation software of a locomotive receiver/transmitter as well as of an evaluation means, or a detector, respectively, result.

During the course of the gap, the central control does not supply energy to a locomotive receiver as explained above. The energy required for return signal transmission is preferably taken from the buffer capacitor available anyway which before has served exclusively for bridging or by-passing interruptions of the current supply to the locomotive receiver caused by poor contacts to the track. In view of the short transmission time of the return signal, the load on the energy source is not significant. Therefore, no additional or larger energy storage means has to be provided in the transmitter of the consumer. Since the consumers, or the locomotives, respectively, may transmit different information within a gap, a plurality of applications are possible. Typically, one to three bytes are retransmitted.

If the retransmitted or returned information is combined with the content of the data packet preceding the gap, the address of the locomotive receiver may in a very simple manner be determined. Furthermore, the location of a locomotive can be determined by means of a receiving detector assigned to a track section corresponding to the location. Localization of the locomotive, in this connection, becomes more accurate the more track sections are available and the more detectors are arranged on the system, where each detector or each evaluation means monitors one separated track section. Assignment of a locomotive address to a location on the track is effected in the following manner: an evaluation means which determines a locomotive address from the track signal adds a unique localization information, for example its own address, to a signal generated by it and sends this signal to the central control so that the complete information is made available.

In summary, the present invention provides a simplified circuit having a larger data transmission rate, a higher safety against interference and offering the possibility of generating a signal of track occupancy while available components of the system do not adversely affect the return signal.

Based on the present invention, the following requirements and disadvantages no longer apply: generation of a carrier or transmitter frequency and modulating this frequency onto the track signal; high frequency influence of existing components and installations on the quality and detectability of the return signal; coupling of return bits to the track signal and, in this manner, limitation of the data amount to be transmitted; Elaborate recovering of the desired signal from a noise spectrum; and the problem of an unambiguous assignment of a return signal to the respective track section. Moreover, embodiments of the present invention can include the following further advantages: locomotives equipped with digital receivers not adapted for the return transmission of data do not affect the return signal; in order to eliminate possible disturbing influences of other components, the latter may be provided with a simple and inexpensive rectifier circuit; already-existing model railways may be supplemented with the present return transmission system while no substantial adaptions of existing components, such as central control or amplifier, are necessary; and "occupancy information" for a track section can be obtained without separate electronic units required beforehand.

Preferably, it is always the consumer addressed immediately before the gap which is transmitting. The bit stream generated is preferably converted independently from its polarity into a form directly suitable as to level and polarity for UARTs.

For generating a gap, each evaluation means preferably includes means for disconnecting the track from the central control and means for short-circuiting the track separated from the central control, which means make the track, for the period of the gap, to a transmission line suited for data transfer. Preferably, data transfer is effected by amplitude and/or frequency modulation of a current signal.

Figure 1:
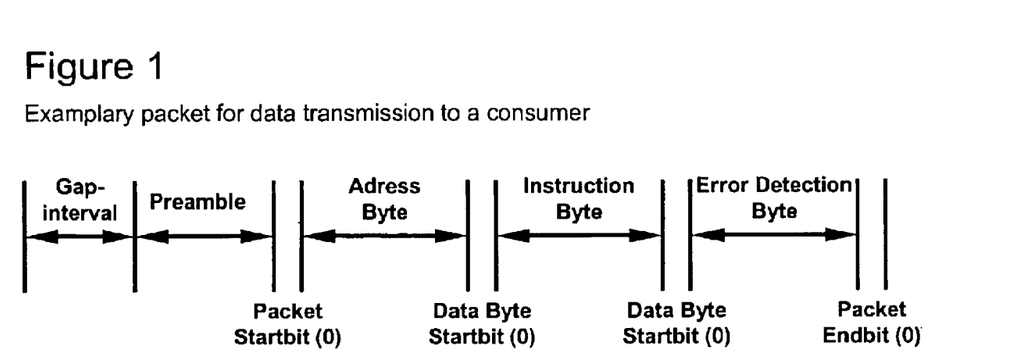
FIG. 1 shows an arrangement of a gap preceding a data packet according to NMRA standard.
Figure 2:
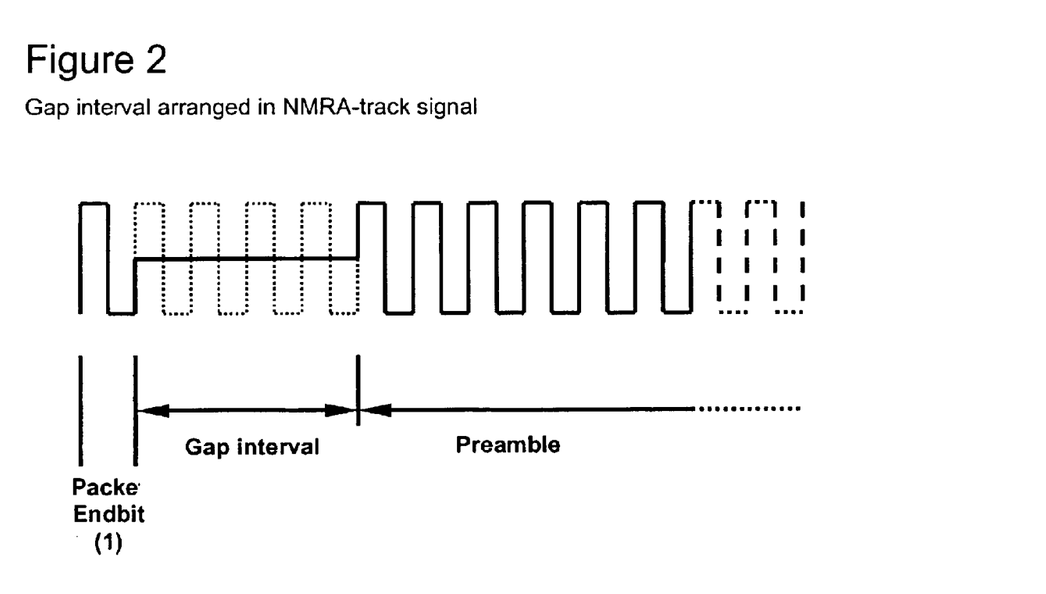
FIG. 2 shows the signal wave form occurring within the gap wherein during the gap the blanked "1" bits of the preamble are indicated by dotting.
Figure 3:
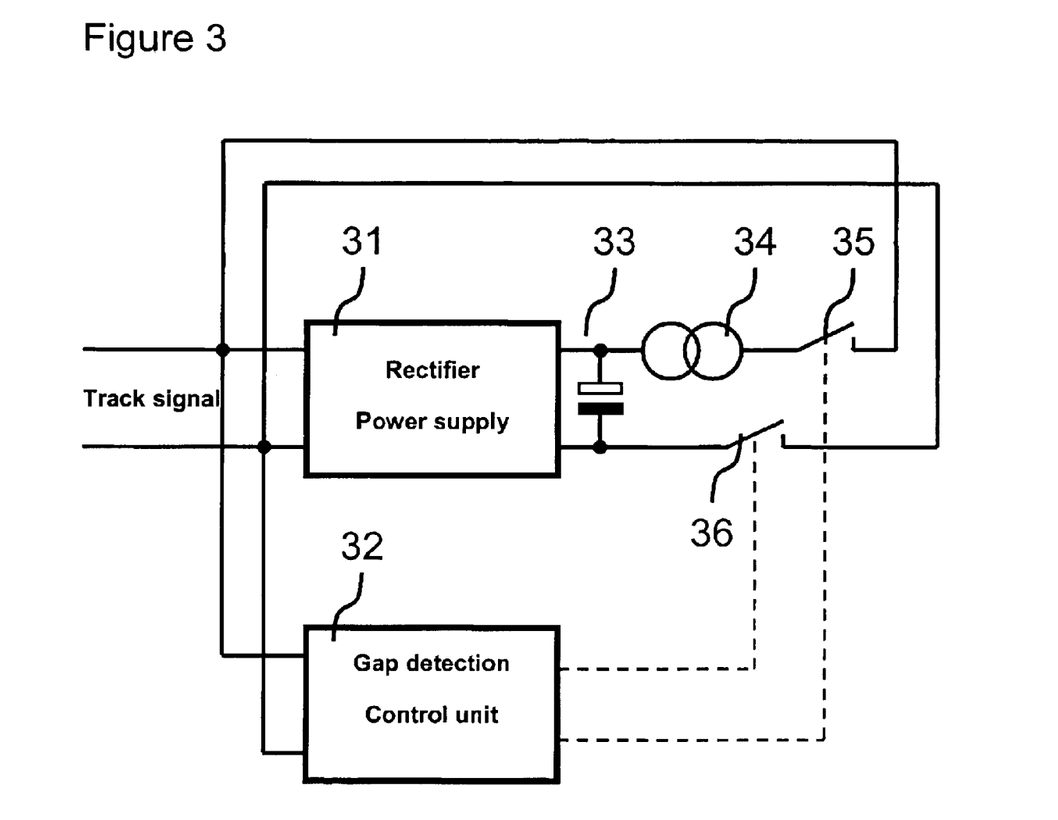
FIG. 3 shows a block diagram of an embodiment of inventional features in a consumer.

Referring to FIGS. 1–7, when transmitting digital information according to NMRA standard from a central control (not shown) to a consumer or receiver of a consumer, which may be a locomotive receiver or stationary receiver according to FIG. 3, the scheme shown in FIG. 1 is used for coding bit values 0 and 1. The gap for return signals arranged before the preamble according to the invention is represented as well. The preamble is a header for a data packet and consists of a sequence of at least ten "1" bits, in most cases, however, 14 or more. The packet start bit is the first "0" bit which follows a header. It terminates the header and signals that the next bits will represent an address byte. After transmission of the address byte there follows again a "0" bit being a data byte start bit and serving as a flag for a following data byte. An error detection byte serves for recognizing transfer errors. A packet end bit at the end of a data byte characterizes the end of a data packet and is a "1" bit.

Although the present invention was implemented for data transfer according to the NMRA DCC Electrical Standard and the NMRA Communication Standard and the comments are based on these standards, the invention is applicable to other forms of digital data transmission of information from a central control to a consumer in a digital model railway, provided that energy is to be transferred via the same voltage path as the control information. This holds true, for example, for standards with pulse width modulation instead of frequency modulation used in the above-mentioned standards. Independent from the standard, an information packet transmitted to a consumer on the track will, principally, include the consumer's address so that the addressee of the data is determined. In principle, the invention would also be applicable to a control system wherein a fixed number of possible consumers is cyclically addressed in a predetermined sequence.

In a preferred embodiment of the invention according to FIG. 2, the gap is provided in the preamble. As can be taken from FIG. 2, the gap is provided immediately adjacent to the packet end bit of the respective preceding packet and has, in the example shown, a length of four "1" bits of the preamble. That means that, by interrupting voltage supply according to the invention, the first four bits of the preamble are blanked in favor of the gap. In this preferred embodiment, the conventional direct sequence of the data packets is not altered by the gap. The gap is preferably provided in the preamble of each data packet. As already set out above, signal transmission is preferably delayed relative to the start of the gap so that the above mentioned disturbing and noise signals on the track can dissipate before transmission of the return signal. This should be taken into consideration when adjusting the total length of the gap which is preferably longer about this dissipation period than the actual return signal period.

Figure 4:
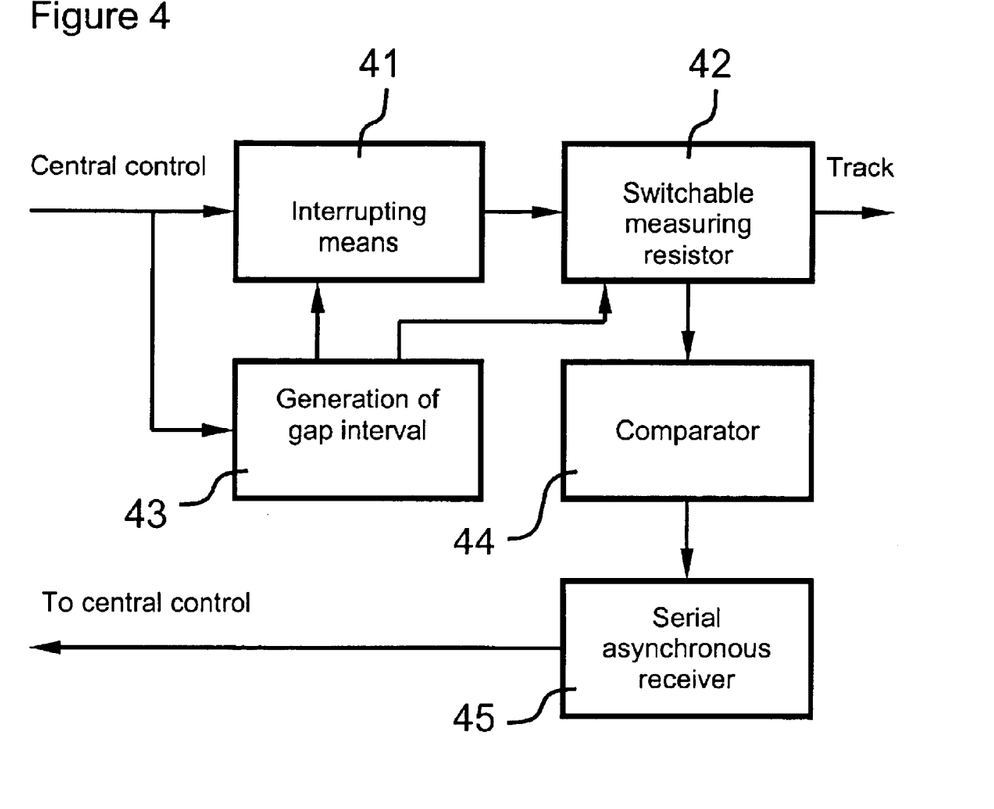
FIG. 4 shows a block diagram of an embodiment of inventional features in an evaluation means.

An evaluation means according to FIG. 4 serves both for generating the gap and for evaluation and further transmission of the return signal generated in this interval. The evaluation means comprises generator means 43 for the gap. Means 43 is connected to the central control (not shown) and receives, in the present embodiment, the track signal from which it detects a packet end bit (FIG. 2) and, based thereon, determines the start of the gap. Alternatively, means 43 could also directly obtain a corresponding control signal for initiating generation of the gap from the central control. Of preference, however, is the first mentioned solution since generator means 43 can also determine the address of the consumer addressed in the preceding data packet from the track signal. Therefore, generator means 43 preferably comprises means for detecting the track signal.

Generator means 43 controls interrupting means 41 for temporarily disconnecting the power supply voltage from the track during the gap. Moreover, generator means 43 is connected to a sensor provided in form of a switchable measuring resistor 42 in order to terminate the track having been disconnected by the interrupting means from the central control by means of the measuring resistor. In order to effect corresponding switching of the measuring resistor 42, the same control signal can be used as for interrupter means 41.

Figure 5:
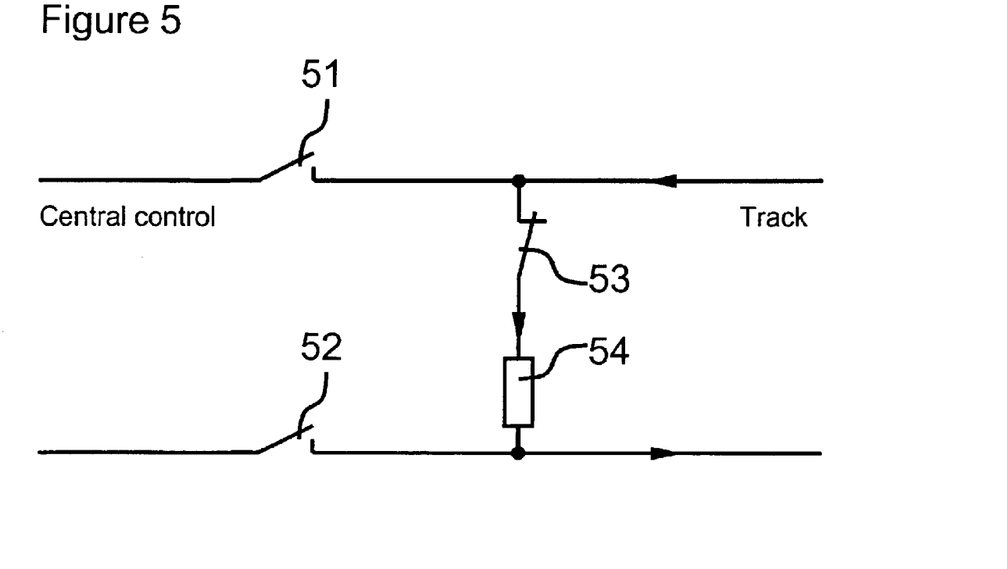
FIG. 5 shows a functional diagram for an interrupter and a switched measuring resistor from FIG. 4 to generate the gap for transmission.

FIG. 5 shows an embodiment of the interrupter means 42 and for a switchable resistor 42. According to this Figure, a disconnecting switch 51, 52 is provided on both track terminals. Following this disconnecting switch, as seen from central control, a measuring resistor 54 is provided in series with a "short-circuit switch" 53. The disconnected track portions are terminated and connected by this series connection. In the present embodiment, the value of the measuring resistor amounts to 100 ohms corresponding to a termination resistor for a two wire line. The track terminals shown are connected in a common manner to the track not shown in the Figure.

Generator means 43 can determine the end of the gap in different ways, such as by evaluating the track signal, for example by counting the bits of the preamble, by means of an internal timer, by a control signal from the central control, and the like. At the end of the gap, measuring resistor 54 is disconnected again by opening switch 53, and disconnecting or interrupt switches 51, 52 are closed again.

Within the gap, switchable measuring resistor 54 measures the return signal, which will be explained further below and which preferably consists of a sequence of current pulses. In a comparator 44, the measuring signal supplied from measuring resistor 54 undergoes a comparison with threshold values and is subsequently supplied to a serial asynchronous receiver/transmitter 45, preferably provided in form of a UART which transmits the return signal detected and processed in the above manner to the central control.

Figure 6:
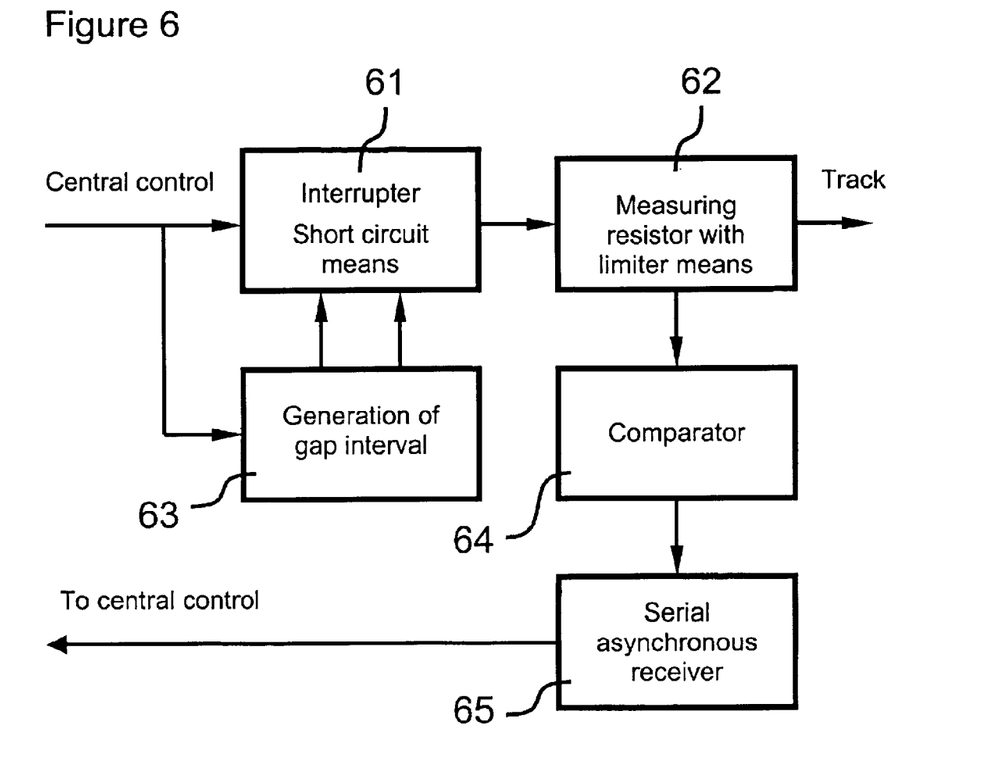
FIG. 6 shows a block diagram of a further embodiment of inventional features of an evaluation means.
Figure 7:
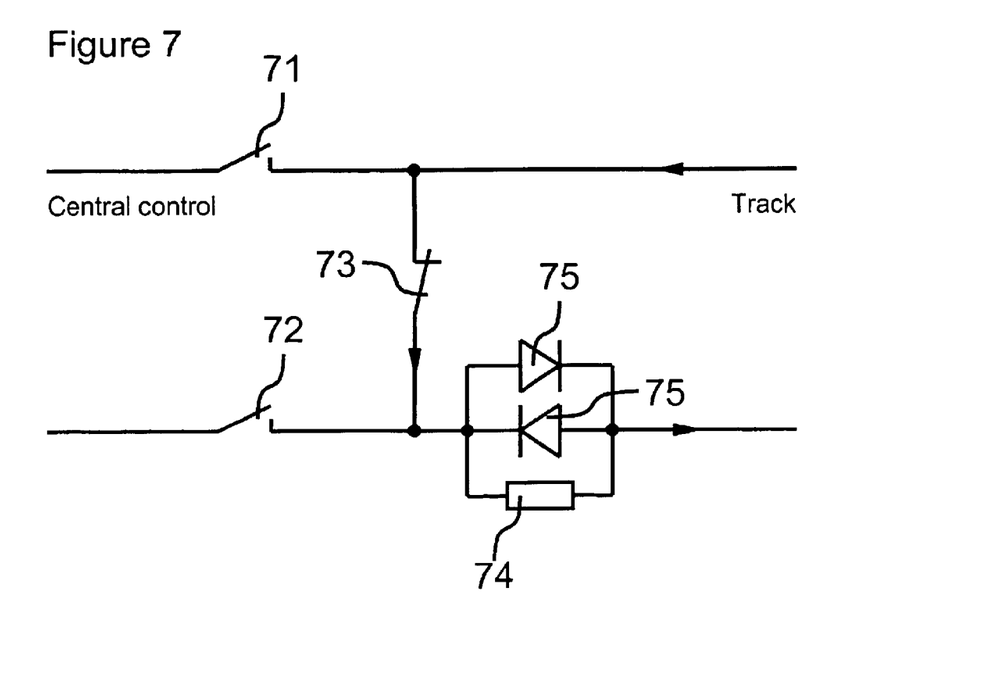
FIG. 7 shows a functional diagram for an interrupter and a measuring resistor with limitation from FIG. 6.

In FIGS. 6 and 7, a preferred embodiment of an evaluation means is shown. The evaluation means includes generator means 63, comparator 64 and serial asynchronous receiver/transmitter UART 65 corresponding to components 43, 44 and 45 in FIG. 4. As can be taken from FIG. 7, measuring resistor 74 is permanently connected to the track terminal, namely in parallel to two limiting diodes 75, 75 which are connected in an antiparallel connection. Components 74, 75 form a measuring resistor 65 with limiting function shown in FIG. 6. The diodes serve for protecting the measuring resistor against current amplitudes of the supply voltage which are high in comparison to the return signal and which occur outside the gaps. Interrupting and short-circuiting means 61 include two interrupting or disconnecting switches 71, 72 and a short-circuit switch 73 by means of which the disconnected or interrupted track terminals can be connected with one another in the manner as shown.

The advantage of the embodiment according to FIGS. 6 and 7 consists in that the permanently connected measuring resistor 62 can simultaneously be employed for generating an occupancy signal signaling track occupancy. Such occupancy signal is generated by detecting the measuring signal across resistor 62 outside the gap.

The evaluation means of the present invention, implemented for example according to FIGS. 4 and 6, may either be integrated in a stationary manner in the model railway system in a power amplifier, the central control or another component of the system, or may be provided as an independent device.

An embodiment for a consumer in form of a locomotive receiver with return signal transmission is shown in FIG. 3. The consumer comprises conventional rectifying and power supply means 31 with buffer capacitor 33 as referred to above. Motor control means not being an essential feature of the present invention are not shown. Rectifying and power supply means 31 are supplied with the track signal (FIGS. 1 and 2) in a common manner. The track signal is moreover supplied to detection and control means 32 in the consumer. Detection and control means 32 for detecting the gap and for control evaluate the track signal as done by generator means 43 of FIG. 4 in order to determine the start and the end, i.e. the length or duration of the gap in order to generate respective control signals for connection switches 35, 36. In the closed state, these two switches 35, 36 connect power source 34 via buffer capacitor 33 with the track. Power source 34 is a power source pulsed or clocked in accordance with the return information to be transmitted by means of the return signal. In the present embodiment according to FIG. 3, switch 36 is maintained constantly closed during generation of the return signal and a modulation of power source 34 is effected by means of ON/OFF-switch 35 such as to generate the return information. Outside the gap interval, switches 35, 36 are constantly open.

Preferably, the track signal is evaluated by a micro controller provided in the receiver of the consumer. The micro controller does not only have the time control information obtained in the above manner for determining the gap interval and generating the return signal but also has the return information which is to be transmitted by means of the return signal. The micro controller is not shown in the figures and may, for example, be provided in detection and control means 32. A UART normally provided in modern micro controllers may be used for actuating switches 35 and 36 and for transmitting the return signal in form of a bit stream.

In this manner, a bit stream is generated by the preferred current modulation. In the present embodiment, the bit stream is received by UARTs provided in microcontrollers of the evaluation means according to FIGS. 4 and 6. The UART's check the bit stream as to validity and correct data receipt before transmitting it to the central control. If required, the information of the return signal may be evaluated as well.

In the present embodiment, three data bytes are transmitted at a transmission rate of 125 kbaud during the gap via the track and are received by the UART of evaluation means 45. Further transmission of the bit stream received by the UART within the gap is effected outside the gap, preferably during the same data packet in order to have a direct assignment to the data packet.

In the present embodiment, transmission of the return signal via the track is effected in form of a current signal having an amplitude of 20 mA. The gap lasts up to four 1 bit periods, i.e. 464 $\mu$s. In this case, data transmission is started at the end of the first 1-bit occurring after the start of the gap. By means of this delayed transmission start it is ensured that inductances present due to the structure of the model railway system may be discharged or dissipated as already set out above.

In principle, it would be possible to employ, instead of the modulated current source, a modulated voltage source for generating the return signal, which, however is more elaborate than current modulation in view of generating the return signal as well as detecting the return signal in the evaluation means. When using voltage modulation one could renounce to short-circuiting or termination by means of a low-resistance current measuring resistor or by means of connecting the two track terminals via a current sensor in general. However, the advantage of a rapid stabilization of disturbing and noise signals would then be lost.

In one alternative embodiment, deviating from the embodiments of FIG. 5 and FIG. 7, only one of the two track terminals might be interrupted or disconnected while the other conductor may be a continuously connected ground terminator so that only one interrupter switch would be necessary.

As already mentioned in connection with the prior art referred to in the beginning, the invention may also be applied to a system comprising a plurality of electrically isolated track sections each of which are connected to the same central control unit. In this case, an interrupter means and a return signal detecting means, or evaluation means, respectively, would have to be assigned to and provided for each electrically isolated track section.

In the present invention, the consumer continuously evaluates the track signal in a manner known per se and converts the control information of the data packets addressed to it. Hence the consumer may, in the same manner as the evaluation means for generating the gap and evaluating the return signal, make use of the square wave voltage on the track for determining the gap and for generating the return signal. The consumer may in this manner include, for example, its own address into the return signal. The evaluation means can use this address to generate an occupancy signal for detecting track occupancies and transmit this signal to the central control or to any other devices. Furthermore, each evaluation means may have its own address which it links or combines with a return signal for further transmission to the central control or other components. If the return signal is supplied from a locomotive addressed in a preceding data packet, an occupancy signal may be obtained together with the address of the track section.

I claim:

1. A method for digital control of electrical consumers in a model railway comprising:

supplying consumers having contact to a track with energy by means of a square wave voltage which is applied to the track and controlling the consumers by modulation of the square wave voltage in accordance with a digital control information;

generating a return signal in a consumer having been supplied with such control information;

interrupting application of the square wave voltage from the track during a predetermined time interval, said consumer applying the return signal within said predetermined time interval to the track being now square wave voltage free; and detecting the return signal transmitted via the track by means of a sensor connected to the track.

2. The method according to claim 1 wherein interruption of the square wave voltage is effected by disconnecting the track from a controller means which generates the modulated square wave voltage.

3. The method according to claim 1 wherein, during said predetermined time interval in which the square wave voltage is interrupted, a current circuit path for said return signal is provided by connecting disconnected track terminals with one another via a current sensor.

4. The method according to claim 1 wherein said digital control information is transmitted in successive control packets and said predetermined time interval is provided either between two successive control packets or in a portion at the start of a preamble of a control packet.

5. The method according to claim 4, wherein the length of the time interval is adjusted to a multiple of the duration of a 1 bit-period of the control packet and wherein, for adjusting the start of the predetermined time interval, a packet end bit of a control packet is used as time reference.

6. The method according to claim 4, wherein the length of the time interval is adjusted to the three to four fold multiple of the duration of a 1 bit of the control packet and wherein, for adjusting of the start of the predetermined time interval a packet end bit of a control packet is used as time reference.

7. The method according to claim 1 wherein a consumer having been addressed immediately prior to such a determined time interval applies its return signal within this time interval to the track.

8. The method according to claim 1 wherein energy for generating said return signal is drawn from a buffer capacitor provided in the consumer and wherein the return signal generated by the consumer is generated by modulation of a current signal.

9. The method according to claim 1 wherein a bit stream of the return signal detected by the sensor is converted into a signal form manageable as to level and polarity by a UART.

10. The method according to claim 1 wherein said return signal is evaluated by referring to control information having been transmitted prior to the control information via the track.

11. The method according to claim 1 wherein said return signal is evaluated by referring to control information having been transmitted prior to the control information via the track in order to generate an "occupancy" information indicating occupancy of the track by a consumer.

12. A device for digital control of electrical consumers in a model railway comprising:

supply and control means for supplying consumers having contact to a track with energy by means of a square wave voltage which is applied to the track and for controlling the consumers by modulation of said square wave voltage in accordance with a digital control information;

a return signal generator provided in the consumer being supplied with such control information for generating a return signal in response to said control information;

interrupting means interrupting application of the square wave voltage from the track during a predetermined time interval, said consumer applying the return signal within said predetermined time interval to the track being now square wave voltage free; and a sensor connected to the track for detecting the return signal transmitted via the track.

13. The device according to claim 12 wherein said interrupting means is provided between said supply and control unit and said track and wherein track terminal connecting means are provided for connecting track terminals separated from said supply and control unit via a current sensor.

14. The device according to claim 13 wherein evaluation means are provided which receives said modulated square wave voltage from said supply and controller unit and evaluating said digital control information for generating a control signal for said interrupting means such as to initiate and terminate said predetermined time interval, and wherein said evaluation means generates a control signal for said track terminal connecting means.

15. The device according to claims 12 wherein in said consumer, detecting and control means are provided which are connected to said return signal generator and which determine based on the digital control information transmitted via the track the start of the predetermined time interval and trigger said return signal generator to apply the return signal to the track.

16. The device according to claims 12 wherein said return signal generator comprises a power source powered by a buffer capacitor provided in said consumer.

* * * * *